US012749618B2

(12) United States Patent
Larsson et al.

(10) Patent No.: US 12,749,618 B2
(45) Date of Patent: Sep. 29, 2026

(54) TAP CHANGER AND A TRANSFORMER ARRANGEMENT COMPRISING THE TAP CHANGER

(71) Applicant: HITACHI ENERGY LTD, Zürich (CH)

(72) Inventors: Tommy Larsson, Ludvika (SE); Jean Louis Gérard Mathae, Ludvika (SE)

(73) Assignee: HITACHI ENERGY LTD, Zürich (CH)

(*) Notice: Subject to any disclaimer, the term of this patent is extended or adjusted under 35 U.S.C. 154(b) by 894 days.

(21) Appl. No.: 18/020,708

(22) PCT Filed: Nov. 6, 2020

(86) PCT No.: PCT/EP2020/081358
§ 371 (c)(1),
(2) Date: Feb. 10, 2023

(87) PCT Pub. No.: WO2022/096124
PCT Pub. Date: May 12, 2022

(65) Prior Publication Data
US 2023/0260695 A1 Aug. 17, 2023

(51) Int. Cl.
*H01F 29/02* (2006.01)
*H01F 27/36* (2006.01)

(52) U.S. Cl.
CPC ........... *H01F 29/025* (2013.01); *H01F 27/36* (2013.01)

(58) Field of Classification Search
CPC ............................... H01F 29/025; H01F 27/36
See application file for complete search history.

(56) References Cited

U.S. PATENT DOCUMENTS

2014/0034464 A1* 2/2014 Larsson ............... H01H 9/0016 200/16 R

FOREIGN PATENT DOCUMENTS

| | | | | |
|---|---|---|---|---|
| DE | 102016203106 | A1 * | 8/2017 | ........... H01H 9/0005 |
| EP | 0001387 | A1 | 4/1979 | |
| EP | 2509089 | A1 | 10/2012 | |
| GB | 887369 | A * | 1/1962 | ............. H01H 19/56 |
| JP | S59126616 | A | 7/1984 | |
| JP | S6346708 | A | 2/1988 | |
| JP | 2009010106 | A * | 1/2009 | |
| KR | 1020140024399 | A | 2/2014 | |

(Continued)

OTHER PUBLICATIONS

International Search Report and Written Opinion of the International Searching Authority, PCT/EP2020/081358, mailed Aug. 16, 2021, 14 pages.

(Continued)

*Primary Examiner* — Malcolm Barnes
(74) *Attorney, Agent, or Firm* — Sage Patent Group

(57) ABSTRACT

The disclosure relates to a tap changer arranged to be connected to a regulating winding of a rated regulation voltage. The tap changer comprises a diverter switch, a tap selector and a set of tap changer contacts. The tap selector and the diverter switch are encapsulated in a shielding structure arranged to shield the tap selector and the diverter switch from an external electrical field, the shielding structure being arranged to be electrically connected to a connected tap of the regulating winding.
The disclosure further relates to transformer arrangement comprising at least one such tap changer.

18 Claims, 9 Drawing Sheets

(56) References Cited

FOREIGN PATENT DOCUMENTS

| | | | |
|---|---|---|---|
| KR | 1020160047543 | A | 5/2016 |
| KR | 1020230054891 | A | 4/2023 |
| WO | 2012126685 | A1 | 9/2012 |
| WO | 2012136426 | A1 | 10/2012 |
| WO | 2021001379 | A1 | 1/2021 |

OTHER PUBLICATIONS

Chinese Office Action, Chinese Patent Application No. 202080105625.8, mailed Sep. 30, 2024, 9 pages.
Korean Decision for Grant and English Translation, Korean Patent Application No., 10-2023-7010720 mailed Apr. 28, 2025, 5 pages.

* cited by examiner

Fig. 7
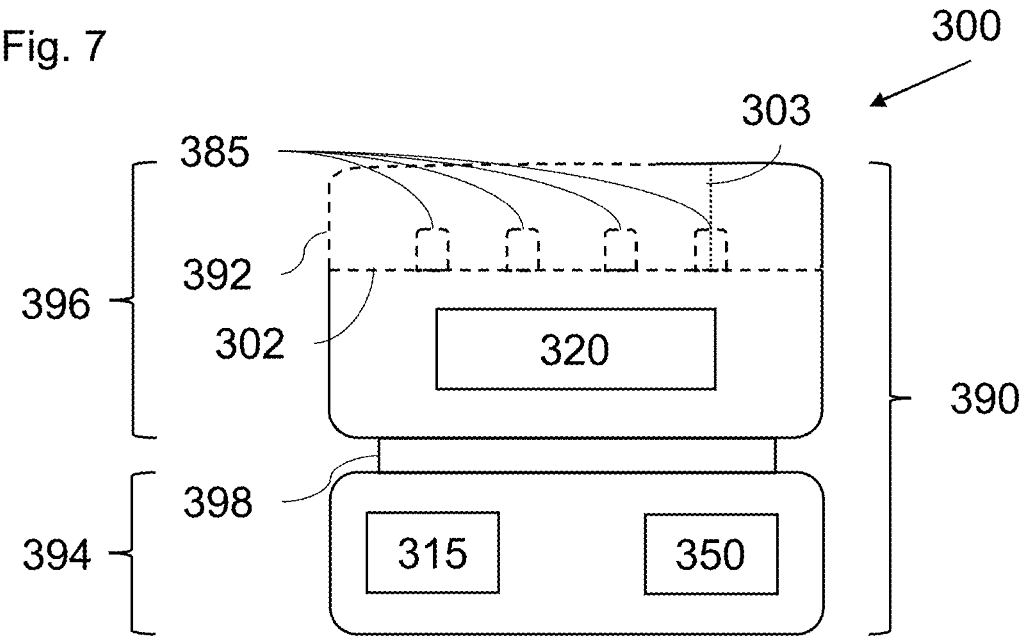
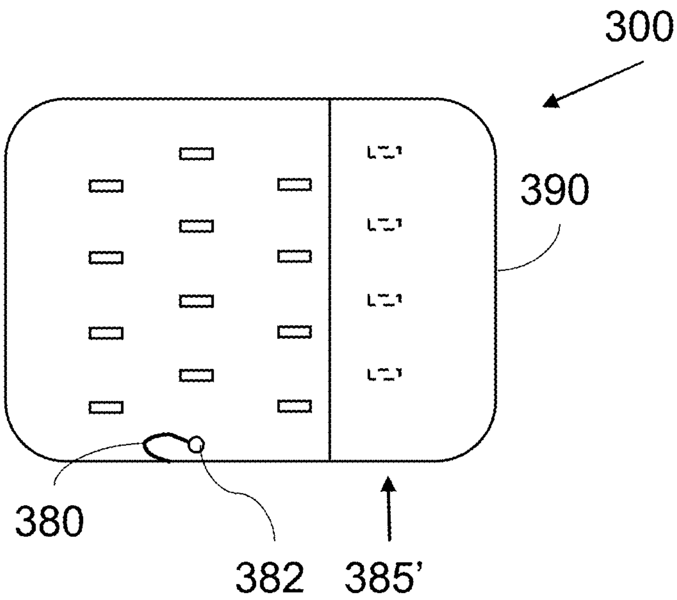
Fig. 8

TAP CHANGER AND A TRANSFORMER ARRANGEMENT COMPRISING THE TAP CHANGER

CROSS REFERENCE TO RELATED APPLICATIONS

This application is a 35 U.S.C. § 371 national stage application of PCT International Application No. PCT/EP2020/081358 filed on Nov. 6, 2020, the disclosure and content of which is incorporated by reference herein in its entirety.

TECHNICAL FIELD

The present disclosure relates to a tap changer and more specifically to an on-load tap changer having a shielding structure. The present disclosure also relates to a transformer arrangement comprising such a tap changer.

BACKGROUND

Tap changers are used for controlling the output voltage of a transformer by providing the possibility of switching in or switching out additional turns in a transformer winding. A tap changer comprises a set of fixed contacts which are connectable to a number of taps of a regulating winding of a transformer, where the taps are located at different positions in the regulating winding. A tap changer further comprises a moveable contact which is connected to a current collector at one end, and connectable to one of the fixed contacts at the other end, i.e. the so-called connected tap. By switching in or out the different taps, the effective number of turns of the transformer can be increased or decreased, thus regulating the output voltage of the transformer. Tap changers are generally customized for a particular application, especially when the tap changer is intended for higher transformer voltage ratings.

An important design factor for tap changers and transformer arrangements is insulation distance. Insulation distance generally means the distance between components which should be kept electrically insulated from each other. The insulation distance depends on factors such as field strengths, insulation materials, positioning of components and geometric shapes of components. Tap changers are exposed to both external and internal electric potentials/fields. External fields may be electric potentials between phases, such as phases of a multi-phase transformer arrangement, or potentials between phase and ground. Internal fields relate to potentials between components within the tap changer. Since external and internal fields are often be superposed in a conventional tap changer in a transformer arrangement, it is a difficult and time-consuming task to calculate and predict the field strengths in different locations and to design, customize and adapt a tap changer for a specific transformer arrangement. Due mainly to the superposed external and internal fields, but also due to the complex task of predicting the fields, the distances between components are necessarily designed to be relatively large, as a safety measure.

EP2509089 B1 discloses a tap changer having a shielding structure which comprises two parts, where one part is formed at least partly by the fixed contacts and the other is arranged to be at the potential of the connected tap. The shielding structure insulates the tap selector such that only internal potentials need to be considered when designing the tap selector, such as for determining insulation materials, insulation distances between components and/or for positioning components in relation to each other. However, non-connected taps are exposed to external potentials between phases. Therefore, the non-connected taps have high insulation requirements to account for potentials between phases and towards ground.

SUMMARY

An object of the present disclosure is therefore to provide a tap changer having an improved performance and a simpler customer interface. A transformer arrangement comprising the disclosed tap changer is further provided, which transformer arrangement is more compact and has a smaller footprint and an increased effect per square meter.

The object is achieved according to a first aspect of the present disclosure by a tap changer arranged to be connected to a regulating winding of a rated regulation voltage, the tap changer comprising a diverter switch, a tap selector and a set of tap changer contacts, wherein the tap selector and the diverter switch are encapsulated in a shielding structure arranged to shield the tap selector and the diverter switch from an external electrical field, the shielding structure being arranged to be electrically connected to a connected tap of the regulating winding.

By encapsulating the diverter switch and the tap selector in the shielding structure which is connected to the potential of the connected tap, the inner parts, e.g. the diverter switch and the tap selector, are almost completely protected from external electric fields. Design of the tap changer is thereby simplified since only internal fields need to be considered when determining insulation properties such as materials and distances, which means that the tap changer may be used in a wider range of applications, without extensive customization and adaptation. In addition, insulation distances may be reduced since the external fields are not superposed on internal electric potentials in any significant way, which yields a more compact design.

Having the potential of the shielding structure at the potential of the connected tap provides for smaller and more predictable potential differences, i.e., internal potential differences between components enclosed by the shielding structure, than in a non-shielded scenario where those components are exposed to external fields and potentials, such as between taps of the regulating winding and neighbouring phases or between the taps and ground. This will be explained more in detail below.

The tap changer contacts of the tap changer comprise both selectable contacts, which are connectable to the taps of the regulating winding, and external contacts which are connectable to neighbouring winding/phases, to the shielding structure, to selectable taps, etc. The tap changer contacts are herein sometimes referred to as a customer interface.

According to an aspect of the disclosure, the tap selector is electrically connected to the set of tap changer contacts, comprising at least two tap changer contacts, at least a part of the tap changer contacts being arranged to be connected to a corresponding tap of the regulating winding, wherein the set of tap changer contacts is arranged at an opening of the shielding structure, and wherein the tap changer contacts are arranged on one side of the tap changer.

The opening of the shielding structure is arranged to allow access to the tap changer contacts, such as for attaching connecting cables to the tap changer contacts. The opening of the shielding structure is adapted to be limited to an area required by the tap changer contacts to allow access to the tap changer contacts.

By "one side of the tap changer" is herein meant that the tap changer contacts are arranged on a side of the tap changer which faces one general direction, such as a side facing a regulating winding of a transformer. In other words, the tap changer contacts are arranged in a delimited area of the tap changer and are not spread out around the tap changer. The tap changer contacts are further arranged in an area delimited by the opening of the shielding structure, such as inside the opening of the shielding structure. Connecting cables from the regulating winding may accordingly approach the tap changer contacts in parallel, from one general direction.

According to an aspect of the disclosure, the shielding structure at least partly covers the set of tap changer contacts at the opening of the shielding structure.

As such, a part of the set of tap changer contacts is considered covered by the shielding structure if an edge of the opening overshoots a surface occupied by the tap changer contacts such that a normal drawn from a center point of at least one tap changer contact, from the surface occupied by the tap changer contacts, intersects an inside surface of the shielding structure.

The tap changer contacts at the opening of the shielding structure constitute objects of irregular shapes which may give rise to increased/focused field strengths, such as at pointed ends or sharp corners, which may in turn result in damaging flashovers. The shielding structure may thus cover and shield a part of the tap changer contacts from the external electric field. By arranging the contacts in a limited area and facing a single direction, the non-covered contacts may be dielectrically shielded by means of connecting cables, as described below.

According to an aspect of the disclosure, the shielding structure comprises a first compartment and a second compartment, separated by an electrically insulating barrier, and wherein the first compartment comprises a first insulating medium and the diverter switch, and wherein the second compartment comprises a second insulating medium and the tap selector.

The first and the second insulating medium may be a fluid, such as an oil e.g., a mineral oil, such as silicone oil, a hydrocarbon oil or an ester-based liquid/oil. The second insulating medium may be the same insulating medium as contained in a transformer tank. As such, when the tap changer is assembled with a transformer tank, the second chamber may share the insulating medium with a transformer inside the transformer tank. The first compartment may be fluidly sealed from the second compartment such that the first and the second insulating mediums are not mixed. In this way, contaminations, such as residue resulting from operation of the diverter switch does not contaminate the second insulating medium of the second compartment and of the transformer tank.

According to an aspect of the disclosure, the tap changer further comprises a change-over selector arranged in the first compartment, and wherein the change-over selector is of a plus/minus switching type or of a coarse/fine switching type.

Since the change-over selector may also contaminate the insulating medium, it is preferably arranged together with the diverter switch in the first compartment.

According to an aspect of the disclosure, the second compartment of the shielding structure comprises the opening and wherein the set of tap changer contacts is arranged at the opening.

As such, the opening of the shielding structure may be arranged inside the transformer tank. The tap changer contacts may thus be arranged inside of the transformer tank when the tap changer is assembled with the transformer tank. Connecting cables may thus be conveniently connected between taps of the regulating winding and the tap changer contacts.

According to an aspect of the disclosure, the shielding structure is made of an electrically conducting material.

The shielding structure thus forms an efficient shield, protecting the internal parts of the tap changer from the external electric field.

According to a further aspect of the disclosure a transformer arrangement comprises a transformer having at least one regulating winding of a rated regulation voltage, which at least one regulating winding has taps. The transformer arrangement also comprises at least one tap changer, having a shielding structure, as described hereinabove. Each of the at least one tap changer is electrically connected to a respective regulating winding such that its shielding structure is electrically connected to a connected tap of the respective regulating winding.

According to an aspect of the disclosure, at least part of the tap changer contacts of the tap changer are electrically connected to a corresponding tap of the regulating winding via electrically insulated connecting cables.

According to an aspect of the disclosure, the connecting cables are arranged in parallel at least in a vicinity of the tap changer contacts.

Arranging the connecting cables in parallel is a convenient way of wiring a transformer arrangement. In addition, it allows for dielectric shielding of the tap changer contacts. That the connecting cables are arranged in parallel at least in a vicinity of the tap changer contacts means that connecting cables are arranged in parallel at least in the delimited area of the opening of the shielding structure, at which opening the tap changer contacts are arranged.

According to an aspect of the disclosure, at least one of the connecting cables is arranged to dielectrically shield at least one of the tap changer contacts before connecting with another tap changer contact.

The connecting cables are arranged to provide dielectric shielding of at least a part of the tap changer contacts. The dielectric shielding is provided by arranging a connecting cable adjacent at least one tap changer contact and connecting the connecting cable to another tap changer contact. Tap changer contacts which cannot be provided with dielectric shielding in this manner are arranged to be covered by the shielding structure, as described above. By arranging the tap changer contacts in a delimited area, such as at the opening of the shielding structure, it is possible to arrange the connecting cables adjacent at least part of the tap changer contacts before connecting to other tap changer contacts.

According to an aspect of the disclosure, the transformer having the at least one regulating winding is housed in a transformer tank containing an electrically insulating medium, and wherein the shielding structure, encapsulating the at least one tap changer, is arranged on a wall of the transformer tank.

The tap changer may be arranged on a wall of the transformer tank such that a part of the tap changer, i.e., a part of the shielding structure, is inside the transformer tank. The tap changer may thus be conveniently interconnected with the transformer inside the tank.

According to an aspect of the disclosure, the transformer arrangement comprises a Y-coupled transformer having three regulating windings and three tap changers, and wherein the three tap changers are encapsulated in one shielding structure electrically connected to a common connected tap of the three regulating windings.

As such, only one shielding structure is required for three tap changers since the phases of the Y-coupled transformer share the potential of the selected tap. Therefore, neighbouring phases do not give rise to superposed potentials. Accordingly, the shielding structure mainly serves to protect the internal components from external potentials between the components and ground.

BRIEF DESCRIPTION OF THE DRAWINGS

Further objects and advantages of, and features of the disclosure will be apparent from the following description of one or more embodiments, with reference to the appended drawings, where:

FIG. 7 is a side view of the tap changer of the present disclosure;

FIG. 8 is a top-down view of the tap changer of FIG. 7;

DETAILED DESCRIPTION

The present disclosure is developed in more detail below referring to the appended drawings which show examples of embodiments. The disclosure should not be viewed as limited to the described examples of embodiments; instead, it is defined by the appended patent claims. Like numbers refer to like elements throughout the description.

Figure 1:
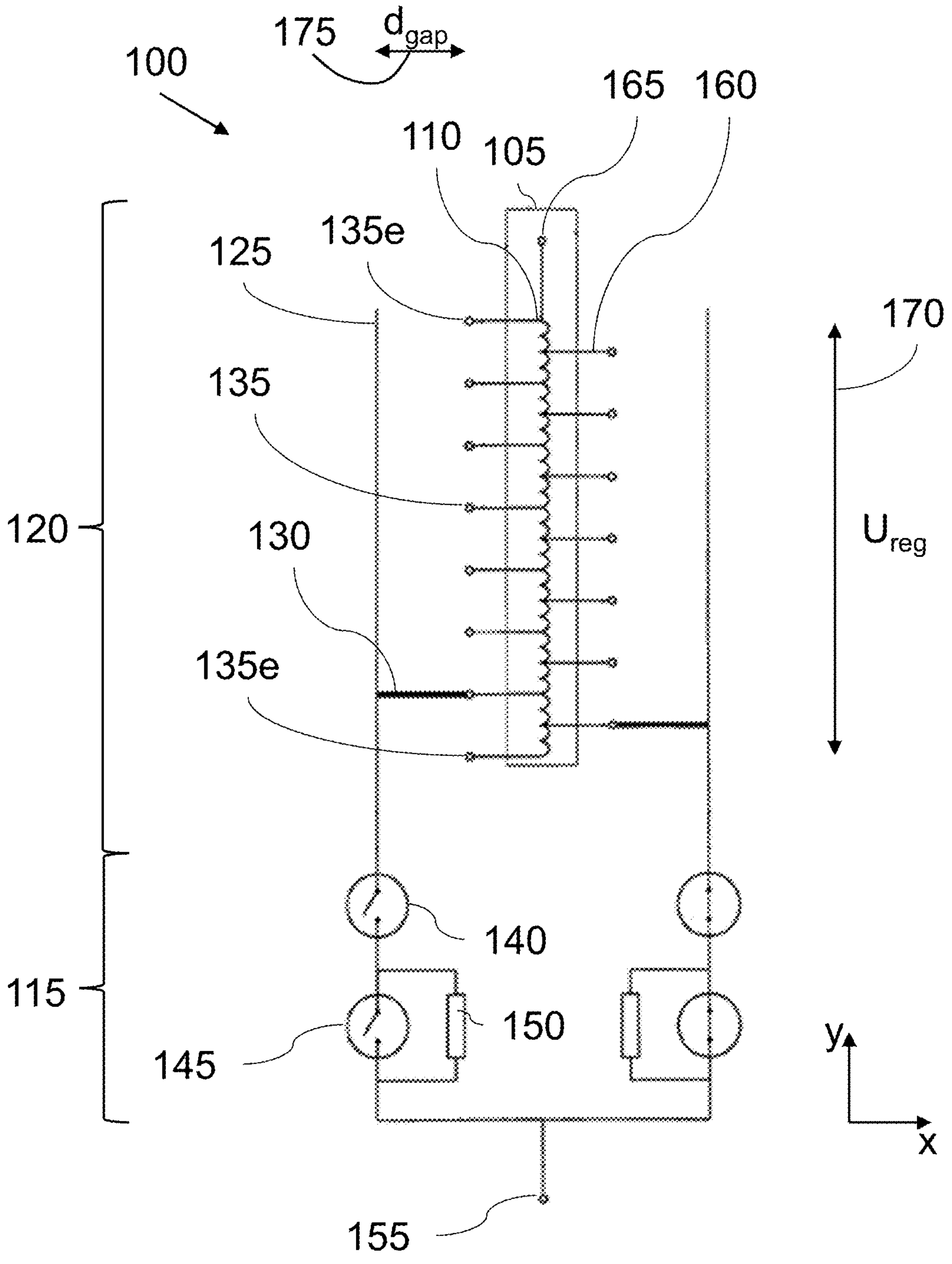
Fig. 1 (prior art)
FIG. 1 is a schematic illustration of a prior art tap changer.

FIG. 1 schematically illustrates a tap changer 100 which is connected to a regulating winding 105 having a set of different taps 110. The tap changer of FIG. 1 is of diverter switch type and comprises a diverter switch 115 and a tap selector 120. The tap selector 120 of FIG. 1 comprises two current collectors 125, two moveable contacts 130 and a set of fixed contacts 135, where, each fixed contact 135 is arranged to be connected to one of the taps 110 of the regulating winding. The tap changer 100 of FIG. 1 has fifteen different fixed contacts 135, and the regulating winding 105 has fifteen taps 110. The tap changer 100 of FIG. 1 is mechanically linear in the sense that the current collectors 125 are implemented as linear rods, and the fixed contacts 135 are arranged in a linear fashion. In the following, the term linear tap changer should be construed as a mechanically linear tap changer, unless stated otherwise. The two current collectors 125 together form a current collector part. In a tap changer 100 having a single current collector 125, the current collector part is formed by the single current collector 125, etc.

The exemplary diverter switch 115 comprises two series connections of a main contact 140 and a transition contact 145, with transition resistor 150 connected in parallel with transition contact 145. Each of the series connections are, at one end, connected to a respective one of the two current collectors 125, and, at the other end, connected to an external contact 155 of the tap changer 100. Other configurations of the diverter switch are possible.

The two moveable contacts 130 are, at one end, in electrical contact with a respective one of the current collectors 125. A moveable contact 130 can move along the current collector 125 to which it is connected, in order to reach different positions, at which the other end of the moveable contact 130 is in electrical contact with one of the fixed contacts 135. The moveable contacts 130 could for example be sliding contacts arranged to slide along the current collectors 125, to allow for electrical connection between the current collectors 125 and the different fixed contacts 135. The driving of the moveable contacts 130 of FIG. 1 is arranged so that if one of the moveable contacts 130 is in contact with a fixed contact 135, connected to a first tap, the other moveable contact 130 is in contact with a fixed contact 135, connected to a tap 110 which is adjacent to the first tap 110.

By switching the main contacts 140 and transition contacts 145 in a conventional manner, one or the other of the moveable contacts 130 will be in electrical contact with the external contact 155, and thus provide an electrical path through the tap changer 100. Similarly, the two current collectors 125 will take turns at being part of the electrical path of the tap changer 100. The electrical path through the tap changer 100 ends at the external contact 155 at one end, and at the fixed contact 135 that is currently connected at the other end. An example of a diverter switch 115 is described in EP0116748. As mentioned previously, the diverter switch 115 of FIG. 1 is an example only, and any suitable type of diverter switch 115 can be used.

As mentioned above, the regulating winding 105 has a set of taps 110, which are shown to be connected to the fixed contacts 135 of the tap changer 100 via connecting cables 160. The connecting cables 160 do not form part of the tap changer 100 per se, but are provided as part of a transformer arrangement as electric connections between the tap changer and a transformer. The other end of the regulating winding 105 is provided with an external contact 165. Depending on which tap 110 is currently connected to a fixed contact 135, the electrical path between the external contacts 155 and 165 will include a different number of the regulating winding turns. The regulating winding 105 is often not seen as part of the tap changer 100, and has therefore been surrounded by a solid line in FIG. 1.

When the tap changer 100 is in use, the different fixed contacts 135 will be at different potential levels, corresponding to the different potential levels of the different taps 110 of the regulating winding 105. The current collector 125, which is currently connected, will be at the potential of the connected tap 110, while the other current collector 125, which is currently disconnected, will be at the potential of the tap 110 which is adjacent to the connected tap 110. Thus, the potential difference between the current collectors 125 will correspond to the potential difference between two adjacent taps 110, $U_{adj}$. $U_{adj}$ is typically constant throughout the regulating winding 105. Only one tap 110 at a time will be connected to the moveable contact 130 which is currently connected to the external connection 155 of the tap changer, this tap 110 being referred to as the connected tap 110.

The potential difference between a current collector 125 and a particular fixed contact 135, on the other hand, varies depending on at which position the moveable contact 130 is connected, and could be considerably larger. In a linear tap changer 100, the maximum potential difference between a current collector 125 and a fixed contact 135 occurs when one of the end fixed contacts 135, denoted 135*e* in FIG. 1, are connected and forms part of the current path through the tap changer 100. In this case, the potential difference between the current collector 125 that is connected, and the end fixed contact 135*e* which is not connected, corresponds to the entire voltage across the regulating winding 100, $U_{reg}$. $U_{reg}$, also referred to as the regulation voltage, is illustrated in FIG. 1 by arrow 170. In order to prevent flashover between the current collectors 125 and the fixed contacts 135, the distance between the current collectors 125 and a fixed contacts 135 should reach or exceed the minimum distance over which the medium, in which the tap changer 100 is immersed, can withstand the voltage obtained, at a particular regulation voltage $U_{reg}$, between the current collector and the fixed contact 135 at the position of the moveable contact 130 which yields the highest voltage between the current collector 125 and the fixed contact (which position of the moveable contact 130 yields the highest voltage varies between the different fixed contacts). This distance, denoted $d_{insul}$ and hereinafter referred to as the rated regulation voltage insulation distance of the tap changer, or insulation distance for short, depends on the medium surrounding the tap selector 120, and increases with increasing rated regulation voltage (which typically depends on the rated voltage of the transformer and the desired number of taps 110). Furthermore, the insulation distance $d_{insul}$ of the tap changer typically varies along the length of the tap changer 100, so that $d_{insul}=d_{insul}(y)$ where y denotes a position along the extension direction of the linear tap changer. The largest possible potential difference between the current collectors 125 and the fixed contacts 135 can occur at the end fixed contacts 135*e*, and the nearer the centre of the arrangement of fixed contact(s) 135, the smaller the maximum potential difference between the current collector 125 and the fixed contacts 135. The insulation distance at the end fixed contacts 135*e* is denoted $d_{endinsul}$. The regulation voltage used for defining the insulation distance is often a test voltage and are one of the parameters for which the tap changer 100 is rated.

The actual distance between the current collectors 125 and the fixed contacts 135 is herein referred to as the contact gap, $d_{gap}$, and is indicated in FIG. 1 by arrow 175. The contact cap in FIG. 1 is shown to be independent of position y along the extension direction. This represents a typical design, where, the contact gap $d_{gap}$ is constant and approximately corresponds to $d_{endinsul}$ However, a contact gap $d_{gap}=d_{gap}(y)$ that varies with position along the extension direction, for example such that $d_{gap}(y)$ is smaller toward the centre of the tap changer 130, could be beneficial in some circumstances.

The contact gap $d_{gap}$, depends on the insulating medium. In a tap changer 100 that is air insulated, the contact gap $d_{gap}$ needs to be considerably larger than in an oil insulated tap changer 100. For example, in an air insulated tap changer 100 wherein the insulation distance is 30 cm, the corresponding insulation distance could typically be around 3 cm in an oil insulated tap changer. Thus, an air insulated tap changer 100 typically needs to be physically larger than if the tap changer 100 were insulated by means of oil. However, in many applications, air insulation is preferred over oil insulation, such as inside buildings, where the risk of fire should be minimized (e.g. in a skyscraper), or in environmentally sensitive areas, where the risk of contamination should be minimized. The term air insulated tap changer 100 should here be construed to include tap changers 100 which are insulated by air or by air-like gases in a controlled space, such as tap changers 100 insulated by nitrogen gas ($N_2$), tap changers 100 insulated by air at a controlled pressure, tap changers 100 insulated by $SF_6$, etc.

The potential difference between the current collectors 125 and the fixed contacts 135 of the tap changer 100 of FIG. 1 will further be influenced by the surrounding electrical fields. In a three-phase power system, a tap changer 100 is typically part of a three-phase tap changer system comprising three different tap changers 100 connected to the three phases of a three-phase transformer. Hence, the electrical field at the tap changer 100 will be influenced by the electric fields surrounding the other two phases of the tap changer system 100, and the transformer to which the tap changer 100 is connected, as well as by other electric fields. For example, the potential difference between the current collectors 125 and the fixed contacts 135 will be influenced by earth potential. Thus, the contact gap $d_{gap}$ should be large enough to allow for a potential difference caused by internal electrical fields originating from the regulation voltage $U_{reg}$, and which is superposed onto the external electric fields. Since the external electric field will vary from application to application, depending on the insulation requirement to ground and between phases, the dimensioning of the contact gap and other parts of the tap changer 100 will generally have to be customized to the requirements of each application. This results in costly manufacturing of tap changers 100.

Figure 2:
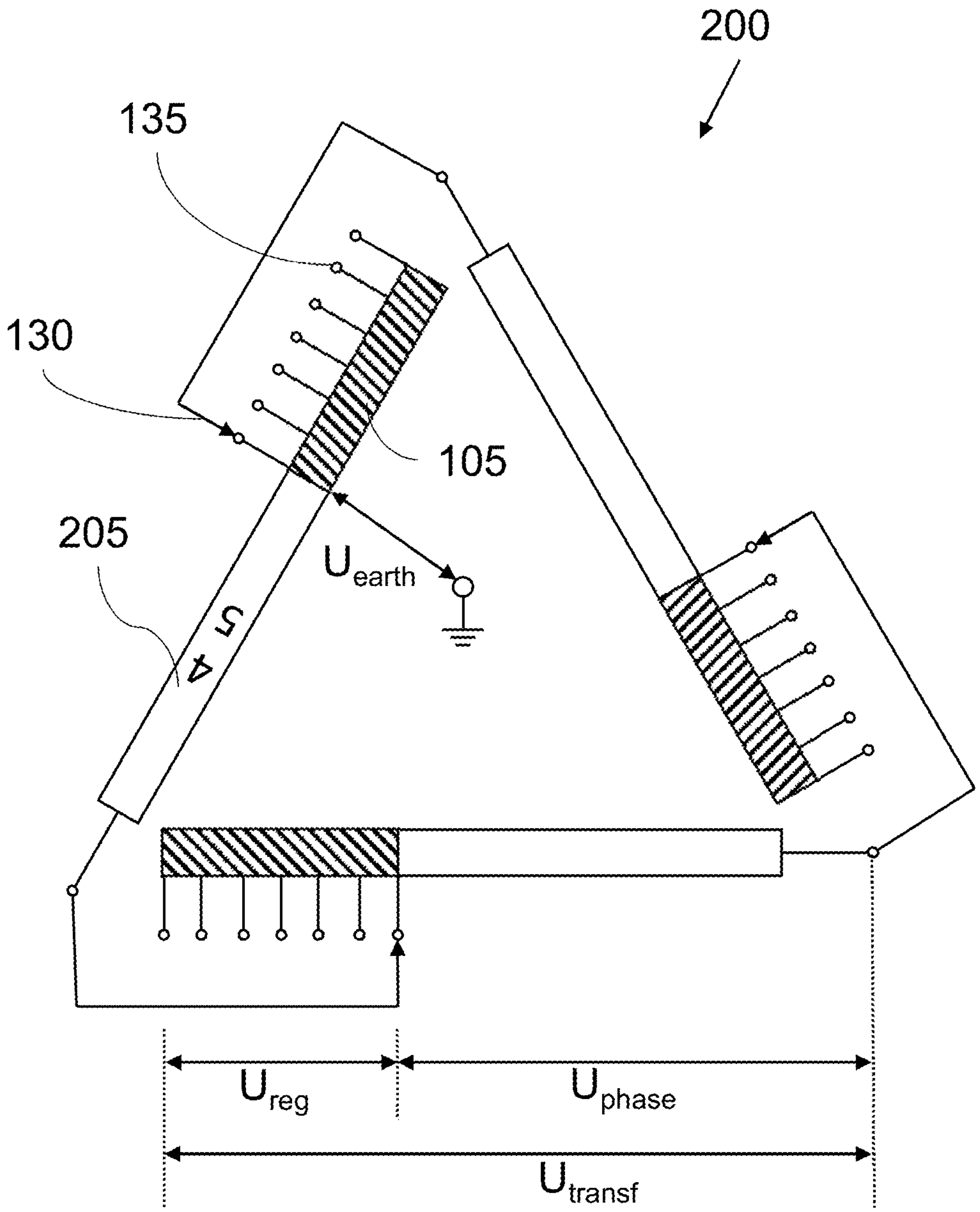
Fig. 2 (prior art)
FIG. 2 shows a prior art transformer arrangement.

FIG. 2 illustrates a three-phase transformer 200 having three transformer phases 205. The illustrated transformer is a delta-configured transformer, but in the following, a transformer in general, without reference to its configuration, will be referred to by reference numeral 200. Each transformer phase 205 has a regulating winding 105. In the configuration shown in FIG. 2, the regulating winding 105 is located at the end of a (inner or outer) transformer winding—this is given as an illustrative example only, and the regulating winding 105 could have an alternative position, for example in the centre of the transformer windings. In FIG. 2, various potential differences occurring in a three-phase transformer 200 are indicated. $U_{reg}$, as presented above, represents the voltage across the entire regulating winding 105. $U_{transf}$ is the voltage between two phases of the transformer. $U_{phase}$ is the voltage between two regulating windings serving two different transformer phases 205; and $U_{earth}$ is the (highest) potential of the regulating winding 105. No tap changers 100 are shown in FIG. 2. Typically, one tap changer 100 will be connected to each regulating winding 105 of a transformer 200, although configurations wherein a single tap changer 100 can be used for the regulation of three transformer phases 205 also exist. The potential of the tap selector 120 of a tap changer 100 lies within the potential range of the regulating winding 105 to which it is connected, i.e., within the range $[U_{earth}, U_{earth}-U_{reg}]$.

Insulation distances in high voltage AC equipment are normally dimensioned in view of rated lightning impulse levels. A rated lightning impulse voltage level for a particular value of the highest voltage for equipment, $U_m$, can be found in standards such as IEC 60214-1. A rated lightning impulse voltage found in the standards is valid for insulation to ground and for insulation between phases. The rated impulse voltage level over the regulating winding 105 will to some extent depend on the rating of the transformer 200, but do also depend on the placement and size of the regulating winding 105. During impulse voltages, capacitance from the regulating winding 105 to the surrounding (especially from the free end created as the moveable contact 130 approaches the external contact 165), as well as capacitance within the regulating winding 135 itself, will play a more important role than the transformer magnetic circuit. A tap changer 100 is therefore normally rated for a specific impulse voltage level over the regulating winding 135, here referred to as a rated regulation voltage, as well as for a specific $U_m$ related to the distance to ground.

Figure 3:
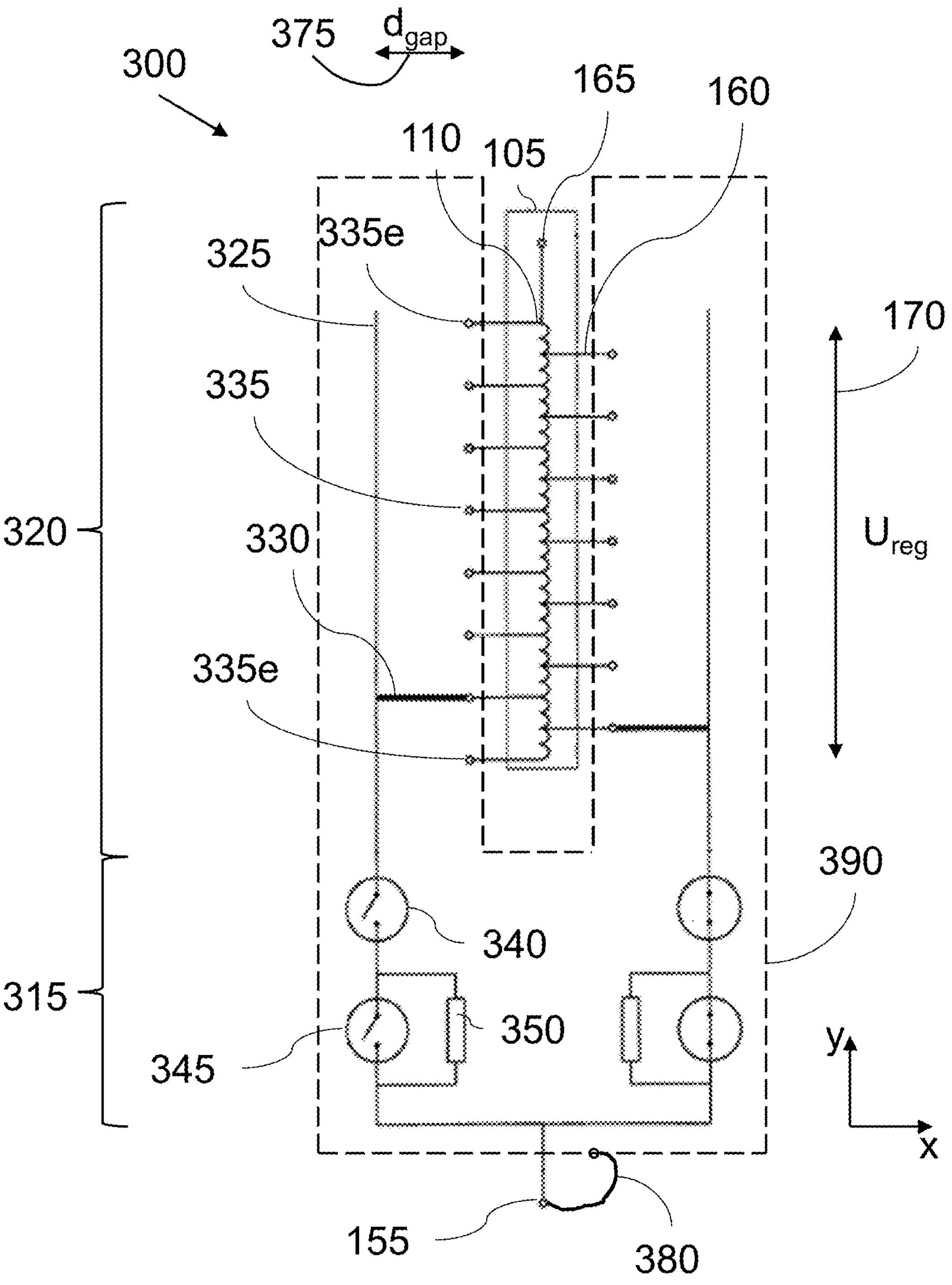
FIG. 3 is a schematic illustration of a prior art tap changer according to the present disclosure.

According to the present disclosure, a tap changer 300, such as an on-load tap changer (OLTC), is encapsulated in a shielding structure 390 which is arranged to shield the tap changer 300 from an external electric field. FIG. 3 schematically shows such a tap changer 300 connected to a regulating winding 105 of a rated regulation voltage. The tap changer 300 comprises a diverter switch 315, a tap selector 320 and a set of tap changer contacts 385. The term "tap changer contacts" comprises all connectable contacts of the tap changer 300, which, depending on application, may include fixed contacts 335, connections for external contact 155 and external contact 165, a shield contact 382 (FIG. 8), etc. The exemplary tap changer 300 shown in FIG. 3 is shown as a linear tap changer, such as the prior art tap changer 100, but the present disclosure is not limited to linear tap changers. The tap selector 320 and the diverter switch 315 are encapsulated in the shielding structure 390 arranged to shield the tap selector 320 and the diverter switch 315 from the external electrical field. The shielding structure 390 is arranged to be electrically connected to a connected tap of the regulating winding 105. The shielding structure 390 may be electrically connected to the connected tap via a shield connection 380, such as between the shielding structure 390 and the external contact 155 or between the shielding structure 390 and a tap changer contact 385, e.g., the shield contact 382 (FIG. 8). In the latter example, the shield contact 382 would in turn be electrically connected to the connected tap.

Figure 4:
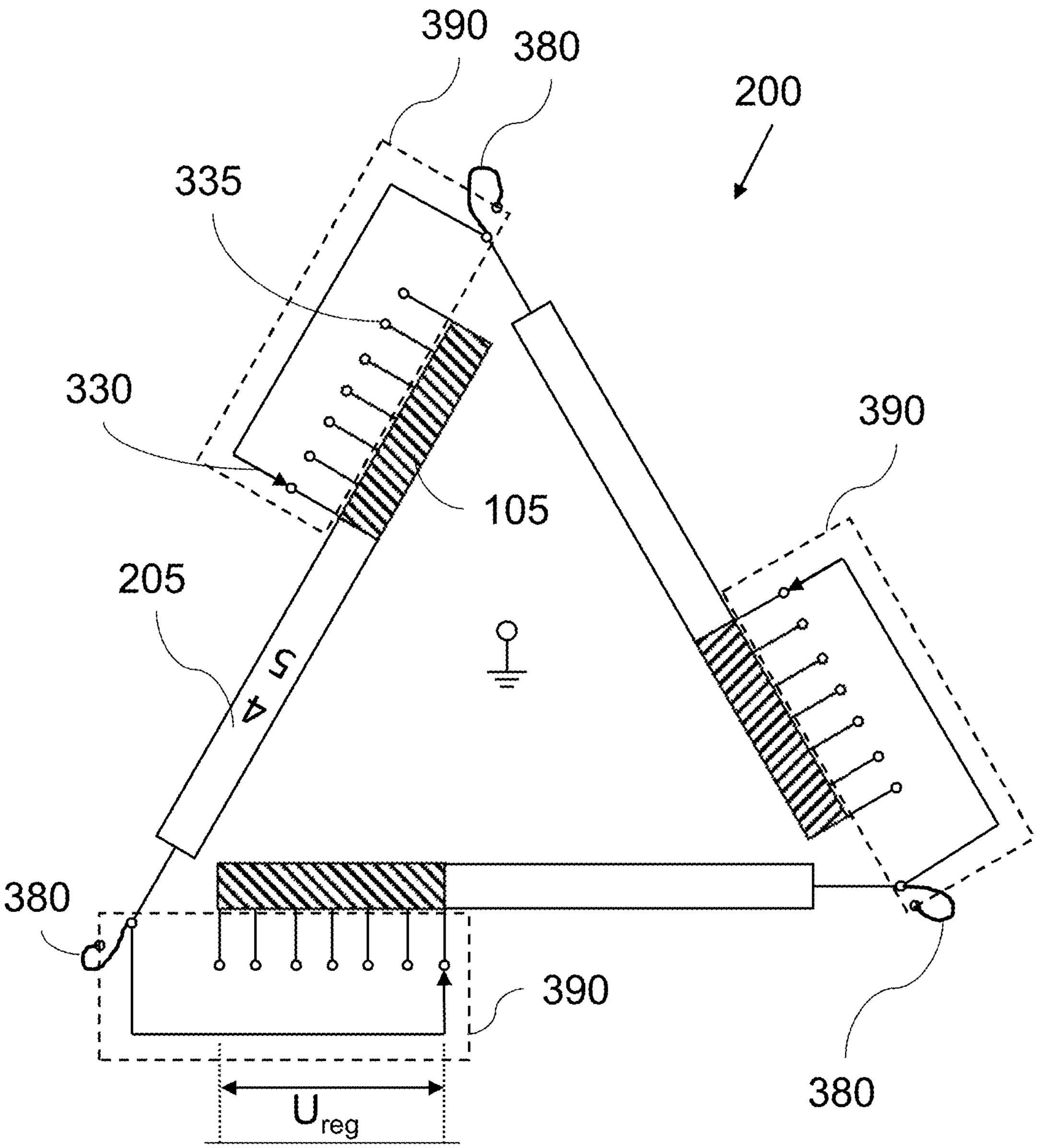
FIG. 4 shows a prior art transformer arrangement according to the present disclosure.

As stated above, the external electric field is effectively screened by the shielding structure 390. FIG. 4 shows a comparison with the prior art three-phase transformer 200 of FIG. 2. The shielding structure 390 removes (or significantly reduces) the external potential between phases and the potential between fixed contacts 335 and ground. $U_{reg}$, which represents the voltage across the entire regulating winding 105, i.e. the internal maximum potential difference, is essentially the only potential that needs to be considered when determining a contact gap $d_{gap}$ 375 (FIG. 3). Since superposed external fields are not a significant factor for the presently disclosed tap changer 300, the contact gap $d_{gap}$ can be reduced, resulting in a more compact tap changer 300, as compared to the prior art tap changer 100. A tap changer 300 having the disclosed shielding structure 390 may further be used in a wider range of applications, i.e. in a wider range of electric field environments, which means that less customization and adaptation is required when manufacturing tap changers 300.

Figure 5:
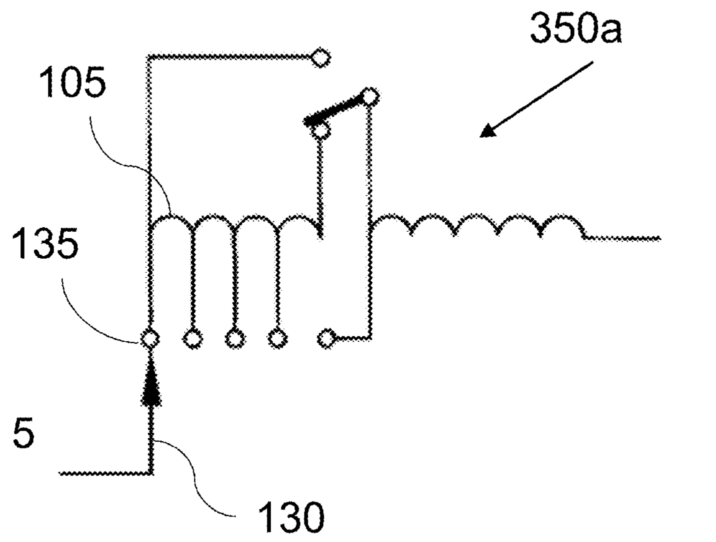
FIG. 5 is a schematic illustration of an optional change-over selector of a plus/minus switching type.
Figure 6:
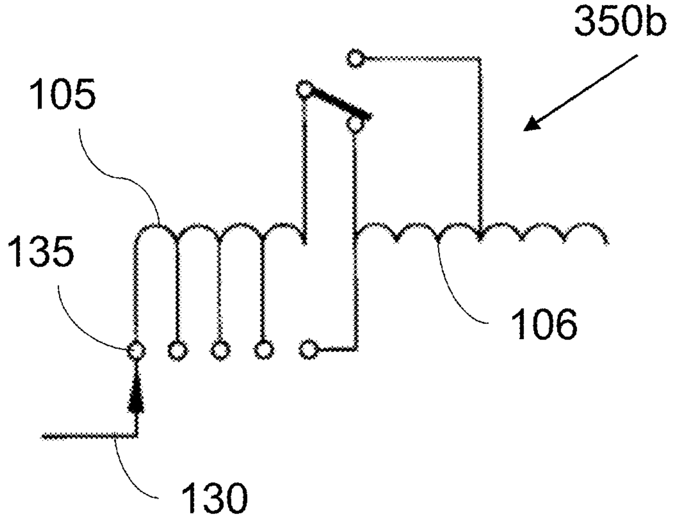
FIG. 6 is a schematic illustration of an optional change-over selector of a coarse/fine switching type.

The tap changer 300 of the present disclosure may also comprise a change-over selector 350. FIG. 5 and FIG. 6 schematically show two types of change-over selectors. In FIG. 5 a change-over selector 350*a* for plus/minus switching is shown. The change-over selector 350*a* extends the regulating range to twice the voltage of the tapped winding, by connecting the main winding to different ends of the regulating winding 105, and thereby reversing a magnetic flux generated by the regulating winding 105. FIG. 6 shows a change-over selector 350*b* for coarse/fine switching, which extends the regulating range to twice the voltage of the tapped winding, by connecting or disconnecting the coarse regulating winding 106. The change-over selector 350 may be connected to the tap changer 300 in a conventional manner and is optionally comprised by the tap changer 300, encapsulated in the shielding structure 390.

FIG. 7 illustrates a side view of an exemplary, conceptual, design of the tap changer 300. As shown, the shielding structure 390 encapsulates the diverter switch 315, the tap selector 320 and the tap changer contacts 385. As stated above, the tap changer 300 may optionally also comprise a change-over selector 350. The shielding structure is preferably made of an electrically conducting material, such as aluminium. The illustrated shape of the shielding structure 390 is only exemplary and is mainly intended to show the extent of the encapsulation.

The tap changer contacts 385 may be arranged on a dielectric surface 302 and may be electrically connected to the diverter switch 315, the tap selector 320 and/or the optional change-over selector 350 via lead-throughs (not shown) in the dielectric surface 302, as required.

The number of tap changer contacts 385 may vary, depending on application. The tap selector 320 is thus electrically connected to the set of tap changer contacts 385 which comprises at least two tap changer contacts 385. At least a part of the tap changer contacts 385 is arranged to be connected to a corresponding tap of the regulating winding. The part of the tap changer contacts 385 which is connected to a corresponding tap 110 of the regulating winding 105 is the set of fixed contacts 335 which are selectable by the tap selector 320.

The set of tap changer contacts 385 is arranged at an opening 392 of the shielding structure 390, such as inside the opening 392 of the shielding structure 390. In FIG. 7, the opening 392 is shown as a dashed part of the shielding structure 390. The tap changer contacts 385 are arranged on one side of the tap changer 300, i.e. such that they are arranged on a side of the tap changer 300 which faces one general direction, for instance a side facing a regulating winding 105 of a transformer 200.

The opening 392 of the shielding structure 390 is arranged to allow access to the tap changer contacts, such as for attaching connecting cables to the tap changer contacts 385. The opening 392 of the shielding structure 390 is further adapted to be limited in size to an area required by the tap changer contacts 385, which allows convenient access to the tap changer contacts 385, while at the same time providing optimal screening of the external electric field.

The tap changer contacts 385 at the opening 392 of the shielding structure 390, which are exposed to the external electric field, constitute objects of irregular shapes which may give rise to increased/focused field strengths, such as at pointed ends or sharp corners of the contacts, which may in turn result in damaging flashovers. The shielding structure 390 at least partly covers the set of tap changer contacts 385 at the opening 392 of the shielding structure 390. A tap changer contact 385 may be defined as covered by the shielding structure 390 if a line 303 normal to the surface 302, drawn from a center point of said tap changer contact 385, intersects an inside surface of the shielding structure 390. For explanatory purposes, such a line 303 is drawn in FIG. 7 to show how the rightmost contacts in the figure are covered by the shielding structure 390. This is further illustrated in FIG. 8, which is a top-side view of the tap changer 300 of FIG. 7. An edge 392' of the opening 390 is shown in FIG. 8. The edge 392' overshoots the rightmost line 385' of tap changer contacts 385 such that they are covered by the shielding structure 390.

FIG. 8 further shows how the shielding structure 390 may be electrically connected to the connected tap via the shield connection 380. In the exemplary embodiment of FIG. 8, the shield connection 380 connects the shielding structure 390 to a tap changer contact 385, which in the illustrated case is a dedicated shield contact 382. The shield contact 382 is in turn electrically connected to the connected tap. FIG. 8 exemplifies the shield connection 380 as a cable connection, but it may be any kind of galvanic connection.

As also shown in FIG. 7, the shielding structure 390 comprises a first compartment 394 and a second compartment 396, separated by an electrically insulating barrier 398. The first compartment 394 comprises a first insulating medium and the diverter switch 315. If a change-over selector 350 is comprised in the tap changer 300, the change-over selector 350 is arranged in the first compartment. The second compartment 396 comprises a second insulating medium and the tap selector 320. The first and/or the second insulating medium may be a fluid, such as an oil e.g., a mineral oil, such as silicone oil, a hydrocarbon oil or an ester-based liquid/oil.

The second compartment 396 of the shielding structure 390 further comprises the opening 392. The set of tap changer contacts 385 is thus also arranged in the opening second compartment 396, at the opening 392.

Figure 9:
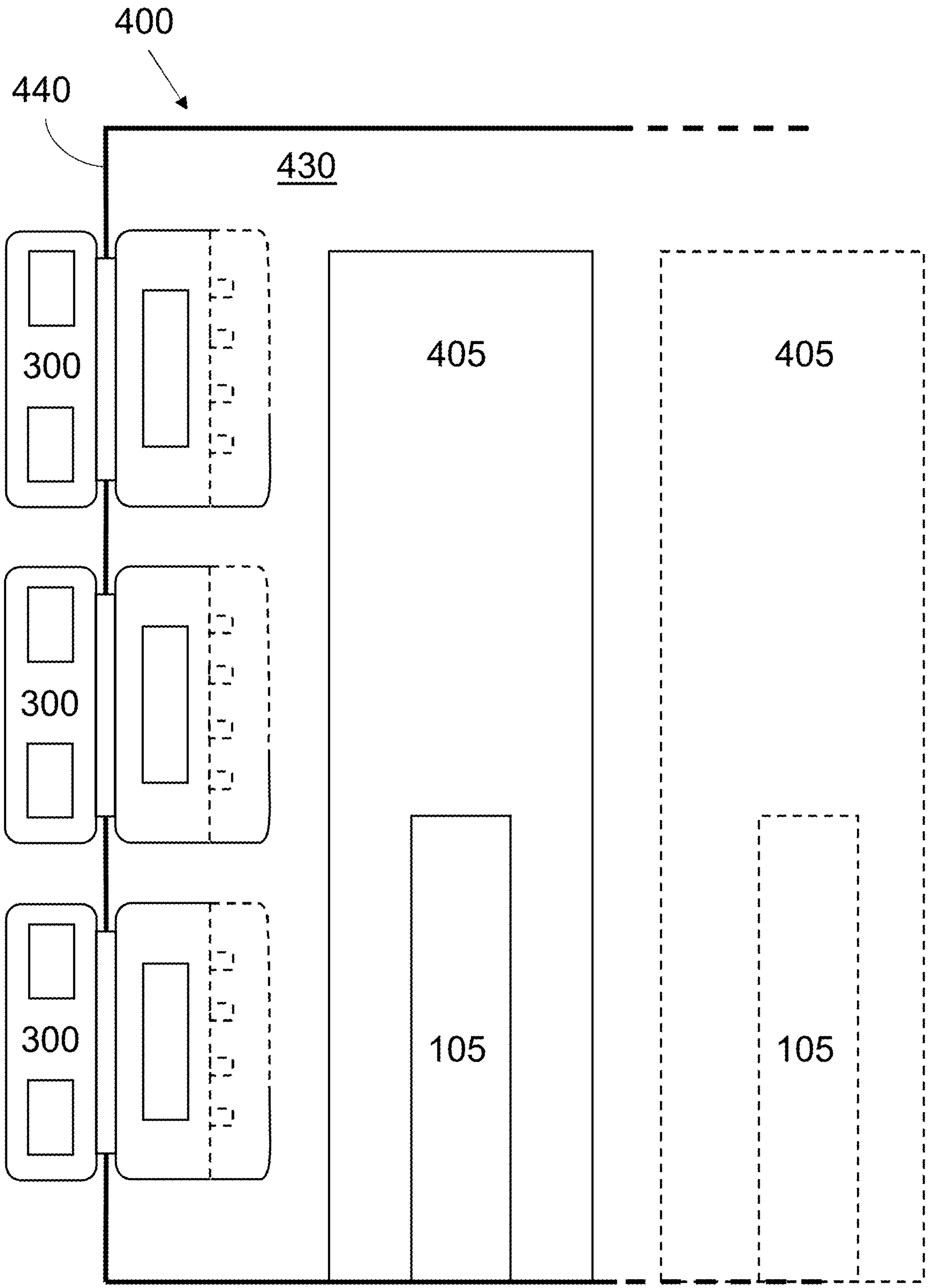
FIG. 9 is a side view of a transformer arrangement according to the present disclosure.

In a further embodiment of the present disclosure, shown in FIG. 9, a transformer arrangement 400 comprises a transformer 420 having at least one regulating winding 105 of a rated regulation voltage. Each of the at least one regulating winding 105 is comprised in a phase winding 405 of the transformer 420. The at least one regulating winding 105 has taps 110. The transformer arrangement 400 also comprises at least one tap changer 300, having a shielding structure 390, as described hereinabove. Each of the at least one tap changer 300 is electrically connected to a respective regulating winding 105 such that its shielding structure 390 is electrically connected to a connected tap of the respective regulating winding 105.

The transformer 420 having the at least one regulating winding 105 is housed in a transformer tank 430 containing an electrically insulating medium. In the exemplary embodiment of FIG. 9, three tap changers 300, but only two phase windings 405/regulating windings 105 are shown. A third phase winding 405/regulating winding 105 can be imagined outside the figure on the right side.

The shielding structure 390, encapsulating the at least one tap changer 300, may be arranged on a wall 440 of the transformer tank 430. By arranging the tap changer 300 on the wall 440 of the transformer tank 430, a part of the tap changer 300, i.e. a part of the shielding structure 390, may be arranged inside the transformer tank 430. The tap changer 300 may thus be conveniently interconnected with the transformer inside the tank via the tap changer contacts 385.

The part of the shielding structure 390 arranged inside the transformer tank 430 is preferably the second compartment 396, comprising the tap selector 320 and the tap changer contacts 385. The second insulating medium of the second compartment 396 may be a same insulating medium as contained in a transformer tank 430. As such, when the tap changer 300 is assembled with a transformer tank 430, the second chamber may share the insulating medium with the transformer 400 inside the transformer tank 430. The first compartment 394 may be fluidly sealed from the second compartment 396 such that the first and the second insulating mediums are not mixed. In this way, contaminations, such as residue resulting from operation (switching) of the diverter switch 315 does not contaminate the second insulating medium of the second compartment 396 or insulating medium of the transformer tank 430. Since the change-over selector 350 may also contaminate the insulating medium, it is preferably arranged together with the diverter switch 315 in the first compartment 394.

A notable special case of a transformer arrangement 400 (not shown in the drawings) comprises a Y-coupled transformer 420 having three regulating windings 105 and three tap changers 300. The three tap changers 300 may be encapsulated in a single shielding structure 390 electrically connected to a common connected tap of the three regulating windings 105 because the phases of the Y-coupled transformer share the potential of the selected tap. Therefore, neighbouring phases do not give rise to superposed potentials. Accordingly, the shielding structure mainly serves to protect the internal components from external potentials between the components and ground.

Figure 10:
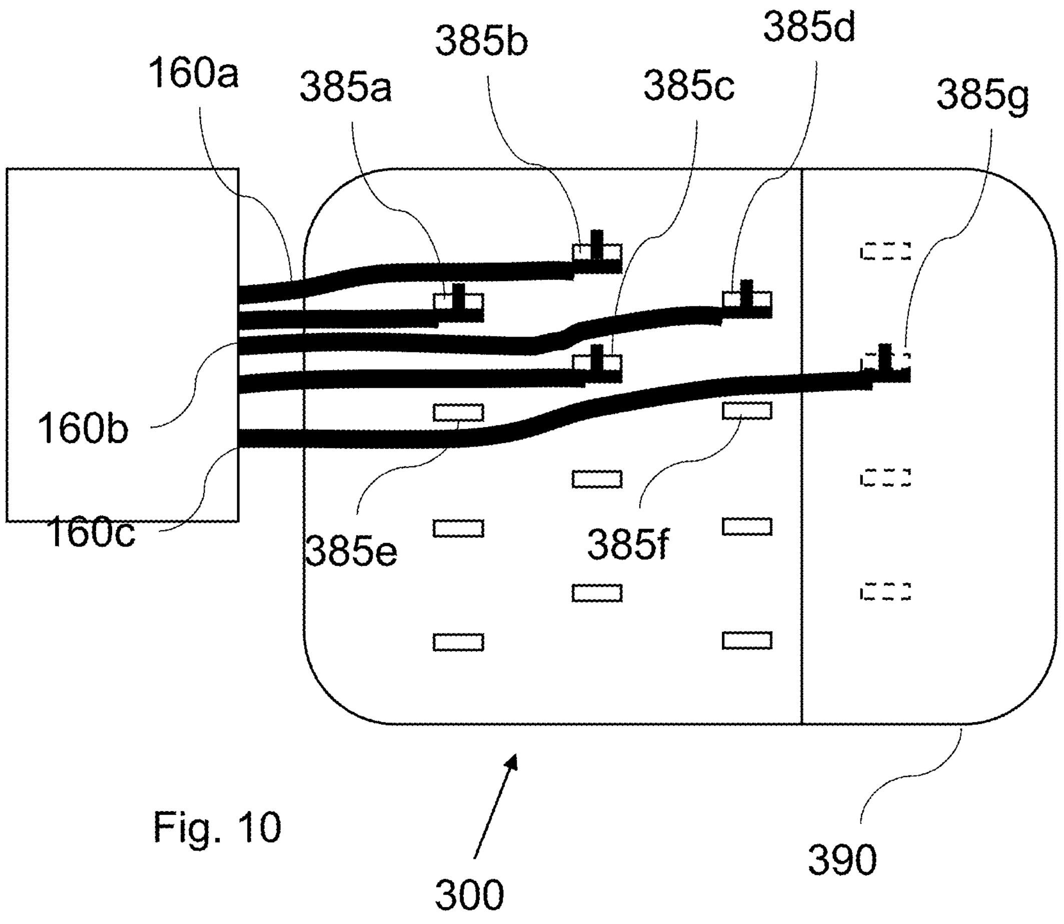
FIG. 10 shows a connecting arrangement for the tap changer of FIG. 8.

For the sake of clarity of the illustration of FIG. 9, the wiring between the tap changers 300 and the regulating windings 105 of the transformer 420 are not shown in FIG. 9. However, at least a part of the tap changer contacts 385 of the tap changer 300 is electrically connected to a corresponding tap 110 of the regulating winding 105 via electrically insulated connecting cables 160. Especially, each of the fixed contacts 335 of the tap changer contacts 385 is connected to a corresponding tap 110 of the regulating winding 105. FIG. 10 shows the top-side view of the tap changer 300 of FIG. 8, with a number of connecting cables 160 added for illustrative purposes. The connecting cables 160 are arranged in parallel at least in a vicinity of the tap changer contacts 385, i.e. at least in the delimited area of the opening 392 of the shielding structure 390, at which opening 392 the tap changer contacts 385 are arranged. Arranging the connecting cables in parallel is a convenient way of wiring the transformer arrangement 400. At least one of the connecting cables 160 is arranged to dielectrically shield at least one of the tap changer contacts 385 before connecting with another tap changer contact 385.

Since the tap changer contacts 385 are arranged in the limited area of the opening 392, the connecting cables 160 may approach the tap changer contacts 385 in parallel from one general direction. This may advantageously be used to provide dielectric shielding for the tap changer contacts 385, which are not covered by the shielding structure 392. The dielectric shielding is provided by arranging an electrically insulated connecting cable 160 adjacent at least one tap changer contact 385 and connecting the connecting cable 160 to another tap changer contact 385. The electric field is reduced at the by-passed tap changer contact 385 because the interposed dielectric material of the insulated connecting cable 160 acts as a screen for said contact. Tap changer contacts 385 which cannot be provided with dielectric shielding in this manner are arranged to be covered by the shielding structure 390, as described above. By arranging the tap changer contacts 385 in a delimited area, such as at the opening 392 of the shielding structure 390, it is possible to arrange the connecting cables 160 adjacent at least part of the tap changer contacts 385 before connecting to other tap changer contacts 385. Thereby, all non-covered tap changer contacts 385 may be provided with dielectric shielding.

In the example shown if FIG. 10, connecting cable **160*a* dielectrically shields tap changer contact 385*a* before connecting with tap changer contact 385*b*. Connecting cable 160*b* dielectrically shields tap changer contact 385*c* before connecting with tap changer contact 385*d*. Connecting cable 160*c* dielectrically shields tap changer contact 385*e* and tap changer contact 385*f* before connecting with tap changer contact 385*g*, which is covered by the shielding structure 390. For the sake of clarity, not all connecting cables 160 which are to be connected to the tap changer contacts 385 are shown in FIG. 10**.

Figure 11:
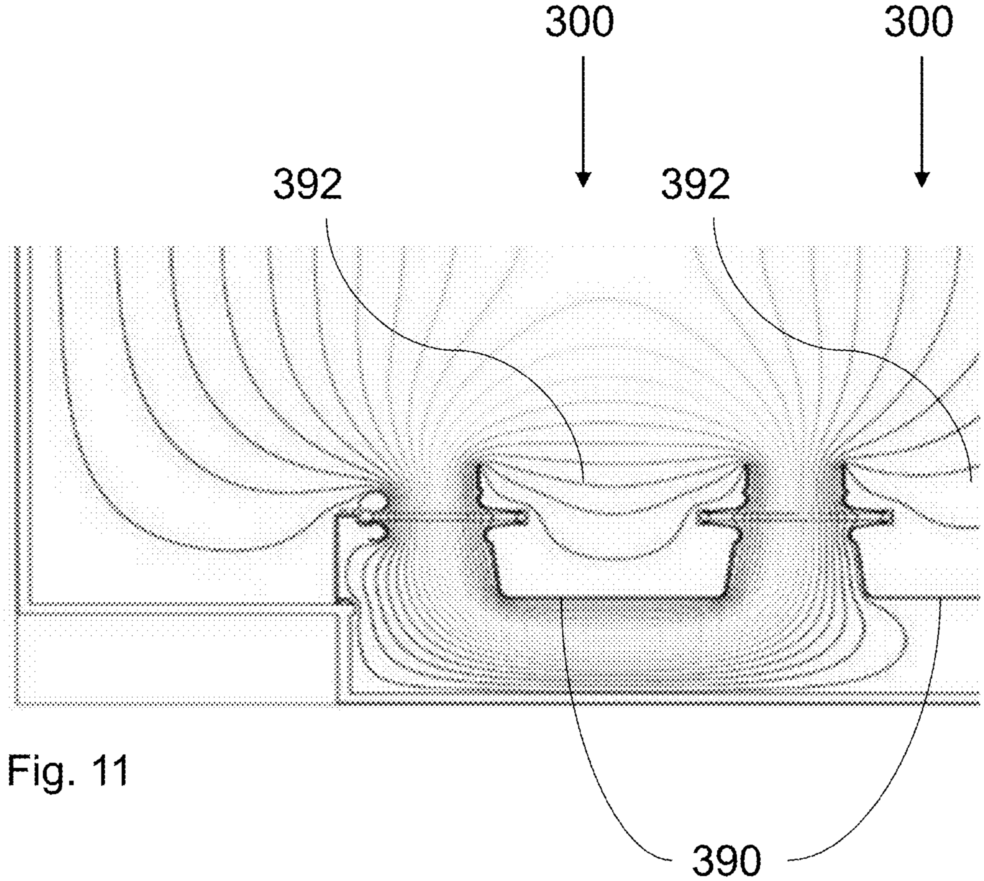
FIG. 11 shows simulated electric field lines in a transformer arrangement according to the present disclosure.

The tap changer 300 is thus effectively protected from the external field by the shielding structure 390 which is electrically connected to the connected tap of the regulating winding 105, and by the connecting cables 160 which provide the tap changer contacts 385 with dielectric shielding. For illustrative purposes, an external electric field is shown in FIG. 11, which is a simulation of tap changer 300 according to the invention, arranged in a transformer environment. The shielding structure 390 of FIG. 9 is simplified, having a different shape than in FIGS. 7-10, and the opening 392 of the shielding structure 390 is larger than required. Also, the tap changer contacts 385 are not included. In order to further simplify the simulation, the phase winding 405, to which the tap changer 300 to the right is connected, is grounded.

The image shows how the shielding structure 390 efficiently screens a volume encapsulated by the shielding structure 390, but that the electric field penetrates the volume through the opening 392. The penetrating field would in practice be significantly/totally reduced by a smaller opening 392 and by the dielectric shielding provided by the connecting cables 160.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A tap changer arranged to be connected to a regulating winding of a rated regulation voltage, the tap changer comprising:
- a diverter switch;
- a tap selector; and
- a set of tap changer contacts;
- wherein the tap selector and the diverter switch are encapsulated in a shielding structure arranged to shield the tap selector and the diverter switch from an external electrical field, the shielding structure being arranged to be electrically connected to a connected tap of the regulating winding;
- wherein the shielding structure comprises a first compartment and a second compartment separated by an electrically insulating barrier, and wherein the first compartment comprises a first insulating medium and the diverter switch, and wherein the second compartment comprises a second insulating medium and the tap selector.

2. The tap changer according to claim 1, wherein the tap selector is electrically connected to the set of tap changer contacts, comprising at least two tap changer contacts, at least a part of the tap changer contacts being arranged to be connected to a corresponding tap of the regulating winding, wherein the set of tap changer contacts is arranged at an opening of the shielding structure, and wherein the tap changer contacts are arranged on one side of the tap changer.

3. The tap changer according to claim 2, wherein the shielding structure at least partly covers the set of tap changer contacts at the opening of the shielding structure.

4. The tap changer according to claim 3, wherein at least one of the at least two tap changer contacts is covered by the shielding structure.

5. The tap changer according to claim 2, wherein the second compartment of the shielding structure comprises the opening and wherein the set of tap changer contacts is arranged at the opening.

6. The tap changer according to claim 1, wherein the tap changer further comprises a change-over selector arranged in the first compartment, and wherein the change-over selector is of a plus/minus switching type or of a coarse/fine switching type.

7. The tap changer according to claim 1, wherein the shielding structure is made of an electrically conducting material.

8. A transformer arrangement comprising:
- a transformer having at least one regulating winding of a rated regulation voltage, the at least one regulating winding having taps;
- at least one tap changer, having a shielding structure, the at least one tap changer arranged to be connected to a regulating winding of a rated regulation voltage, each of the at least one tap changer comprising:
  - a diverter switch;
  - a tap selector; and
  - a set of tap changer contacts, wherein the tap selector and the diverter switch are encapsulated in the shielding structure arranged to shield the tap selector and the diverter switch from an external electrical field, the shielding structure being arranged to be electrically connected to a connected tap of the regulating winding; and
- wherein each of the at least one tap changer is electrically connected to a respective regulating winding such that its shielding structure is electrically connected to a connected tap of the respective regulating winding;
- wherein the shielding structure comprises a first compartment and a second compartment separated by an electrically insulating barrier and wherein the first compartment comprises a first insulating medium and the diverter switch and wherein the second compartment comprises a second insulating medium and the tap selector.

9. The transformer arrangement according to claim 8, wherein at least a part of the tap changer contacts of the at least one tap changer is electrically connected to a corresponding tap of the regulating winding via electrically insulated connecting cables.

10. The transformer arrangement according to claim 9, wherein the connecting cables are arranged in parallel at least in a vicinity of the tap changer contacts.

11. The transformer arrangement according to claim 9, wherein at least one of the connecting cables is arranged to dielectrically shield at least one of the tap changer contacts before connecting with another tap changer contact.

12. The transformer arrangement according to claim 8, wherein the at least one regulating winding is housed in a transformer tank containing an electrically insulating medium, and wherein the shielding structure, encapsulating the at least one tap changer, is arranged on a wall of the transformer tank.

13. The transformer arrangement according to claim 8, comprising a Y-coupled transformer having three regulating windings and three tap changers, and wherein the three tap changers are encapsulated in one shielding structure electrically connected to a common connected tap of the three regulating windings.

14. The transformer arrangement according to claim 8, wherein the tap selector is electrically connected to the set of tap changer contacts, comprising at least two tap changer contacts, at least a part of the tap changer contacts being arranged to be connected to a corresponding tap of the regulating winding, wherein the set of tap changer contacts is arranged at an opening of the shielding structure, and wherein the tap changer contacts are arranged on one side of the tap changer.

15. The transformer arrangement according to claim 14, wherein the shielding structure at least partly covers the set of tap changer contacts at the opening of the shielding structure.

16. The transformer arrangement according to claim 14, wherein the second compartment of the shielding structure comprises the opening and wherein the set of tap changer contacts is arranged at the opening.

17. The transformer arrangement according to claim 8, wherein the tap changer further comprises a change-over selector arranged in the first compartment, and wherein the change-over selector is of a plus/minus switching type or of a coarse/fine switching type.

18. The transformer arrangement according to claim 8, wherein the shielding structure is made of an electrically conducting material.

* * * * *